United States Patent
Tran et al.

(10) Patent No.: US 8,788,130 B1
(45) Date of Patent: Jul. 22, 2014

(54) ELECTROMAGNET-BASED ROLLING ROBOT

(75) Inventors: Nghia X. Tran, San Diego, CA (US); James Eric Anderson, Ramona, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 198 days.

(21) Appl. No.: 13/482,770

(22) Filed: May 29, 2012

(51) Int. Cl.
*B62D 57/024* (2006.01)
*G05D 1/02* (2006.01)

(52) U.S. Cl.
CPC ............ *B62D 57/024* (2013.01); *G05D 1/0259* (2013.01); *Y10S 901/40* (2013.01)
USPC .............................................. 701/22; 901/40

(58) Field of Classification Search
CPC ..... G04D 1/02; A63H 33/005; B62D 57/024; G05D 1/02; G05D 1/0259; B60B 19/006; B60B 19/14; B60B 39/00
USPC ............. 701/22; 180/167; 104/138.2; 901/40
See application file for complete search history.

(56) References Cited

U.S. PATENT DOCUMENTS

| | | | |
|---|---|---|---|
| 3,960,229 A | 6/1976 | Shio | |
| 6,468,350 B1 | 10/2002 | Hillenbrand | |
| 2008/0097644 A1* | 4/2008 | Kaznov et al. | 700/245 |

FOREIGN PATENT DOCUMENTS

JP 2010076707 A * 4/2010

OTHER PUBLICATIONS

Chirikjian, Headlines@Hopkins News Release, Spherical Motor Allows Ball-Based 3-D Movement, Jan. 12, 2001, Office of News and Information, Johns Hopkins University (http://www.jhu.edu/news/home01/jan01/sphere.html).*
Rotundus AB, Rotundus Terrain Capability, Aug. 21, 2010, rotundus.se (http://www.rotundus.se/performance.html).*
Sakagami et al., Center of Gravity Movement Device and Center of Gravity Movement Method, Apr. 8, 2010, Japanese Paten Publication JP 2010-076707 A—Machine Translation.*
Crossley, Vincent A.; A Literature Review on the Design of Spherical Rolling Robots; available online at http://citeseerx.ist.psu.edu/viewdoc/summary?doi=10.1.1.86.4193 by at least May 2012.
Ylikorpi and Suomela; Ball-shaped Robots; Climbing & Walking Robots, Towards New Applications, edited by Houxiang Zhang, ISBN 978-3-902613-16-5, pp. 546, Oct. 2007, Itech Education and Publishing, Vienna, Austria.
Munnoz; Spherical machines: a literature review; CODEN:LUTEDX/(TEIE-7208)/1-141(2005).

* cited by examiner

*Primary Examiner* — John Q Nguyen
*Assistant Examiner* — Nadeem Odeh
(74) *Attorney, Agent, or Firm* — SPAWAR Systems Center Pacific; Kyle Eppele; Ryan J. Friedl (57) ABSTRACT

A rolling device configured to adhere to and roll over a ferrous surface comprising: a structure, a controller, an inertial measurement unit (IMU), and a plurality of electromagnets. The structure has inner and outer surfaces and a closed-shape cross section. The electromagnets are mounted to the inner surface and distributed over a periphery of the structure. The controller is operatively coupled to each of the electromagnets. The IMU is mounted within the structure and operatively coupled to provide inertial measurements to the controller. The controller is configured to cause the structure to roll over the ferrous surface in a desired direction by selectively energizing individual electromagnets while de-energizing other electromagnets.

9 Claims, 8 Drawing Sheets

ELECTROMAGNET-BASED ROLLING ROBOT

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101063.

BACKGROUND OF THE INVENTION

Current remote controlled and/or autonomous rolling devices, such as spherical robots, comprise many moving parts such as mechanical moving weights, actuators, etc. There is a need for a rolling device having fewer moving parts and requiring less maintenance.

SUMMARY

Disclosed herein is a rolling device configured to adhere to and roll over a ferrous surface comprising: a structure, a controller, an inertial measurement unit (IMU), and a plurality of electromagnets. The structure has inner and outer surfaces and a closed-shape cross section. The electromagnets are mounted to the inner surface and distributed over a periphery of the structure. The controller is operatively coupled to each of the electromagnets. The IMU is mounted within the structure and operatively coupled to provide inertial measurements to the controller. The controller is configured to cause the structure to roll over the ferrous surface in a desired direction by selectively energizing individual electromagnets while de-energizing other electromagnets.

Another embodiment of the rolling device disclosed herein comprises a transparent, substantially spherical shell, a plurality of electromagnets, a controller, an inertial measurement unit, and at least one sensor. The electromagnets are distributed over, and mounted to, the inside of the spherical shell. The controller is mounted to the inside of the spherical shell and operatively coupled to each of the electromagnets. The inertial measurement unit is mounted to the inside of the spherical shell and operatively coupled to the controller. The at least one sensor is configured to sense a characteristic of an atmosphere outside of the spherical shell. The controller is configured to selectively energize and de-energize individual electromagnets in order to cause the spherical shell to roll over and adhere to a ferrous surface such that propulsion and adhesion are performed solely via the electromagnets.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
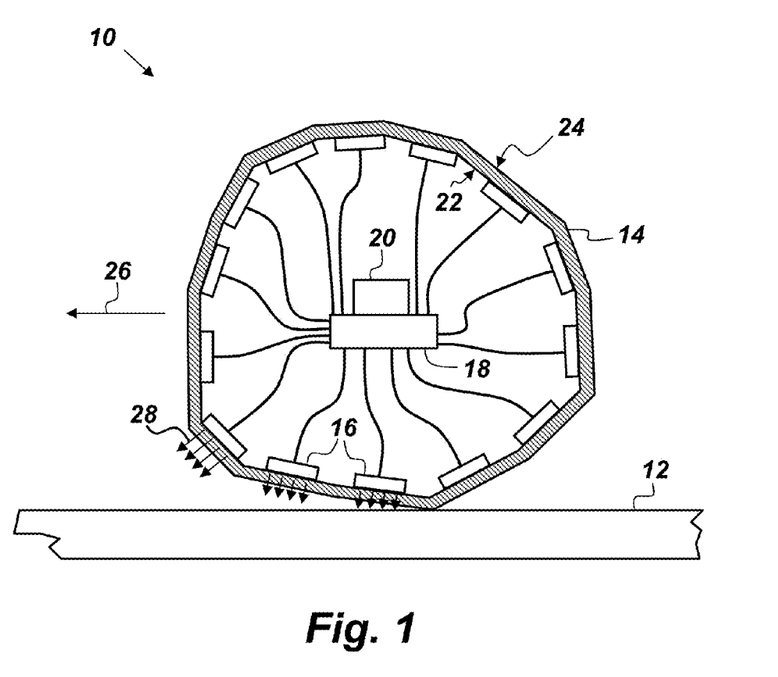
FIG. 1 is a cross-sectional view of a rolling device.

FIG. 1 is an illustration of a rolling device 10 which is configured to adhere to and roll over a ferrous surface 12. The rolling device 10 comprises a structure 14, a plurality of electromagnets 16, a controller 18, and an inertial measurement unit (IMU) 20. The structure 14, which may be any desired size or shape that has a closed-shape cross section, has an inner surface 22 and an outer surface 24. The plurality of electromagnets 16 are mounted to the inner surface 22 and are distributed over a periphery of the structure 14. The controller 18 is operatively coupled to each of the electromagnets 16. The IMU 20 is mounted within the structure 14 and operatively coupled to provide inertial measurements to the controller 18. The controller 18 is configured to cause the structure 14 to roll over the ferrous surface 12 in a desired direction (depicted by arrow 26 in FIG. 1) by selectively energizing individual electromagnets 16 while de-energizing other electromagnets 16. In order to move over the ferrous surface 12, the controller 18 selectively energizes particular electromagnets 16 to create an attractive force 28, which causes the structure 14 to roll in direction 26. The rolling device 10 may be remotely controlled or autonomous. The rolling device 10 may be configured to map, keep track of, and record positions, time, and other information in a memory storage coupled to the controller 18.

Figure 2:
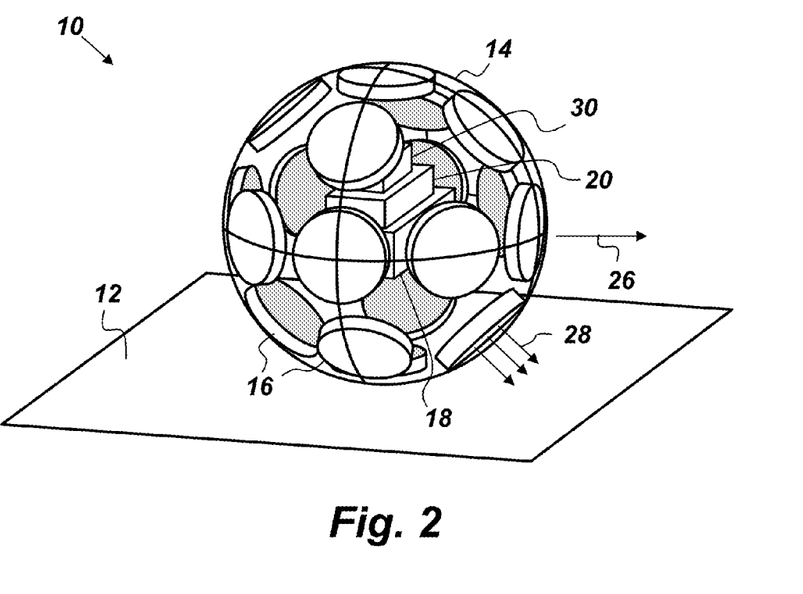
FIG. 2 is a perspective view of a substantially spherical embodiment of a rolling device.

FIG. 2 is a perspective view of a substantially spherical embodiment of rolling device 10 with no moving parts. In this embodiment, the structure 14 is transparent, substantially spherical, and houses eighteen electromagnets 16. Again, it is to be understood that the structure 14 may be any desired size or shape, having any desired number of sides, and that a sphere is only one embodiment of the structure 14. In addition, the structure 14 may be hard, elastic, or flexible. It is also to be understood that the rolling device 10 may have any desired number of electromagnets 16. In the embodiment of the rolling device 10 shown in FIG. 2, a sensor 30 is operatively coupled to the controller 18. The sensor 30 is configured to generate an output signal representative of an environmental characteristic outside the structure 14. Suitable examples of the sensor 30 include, but are not limited to: a microphone, a pressure sensor, a chemical sensor, a temperature sensor, a still camera, a video camera, a depth sensor, a global positioning system (GPS) sensor, and a radioactivity sensor. The rolling device 10 may comprise one or more sensors 30.

Figure 3:
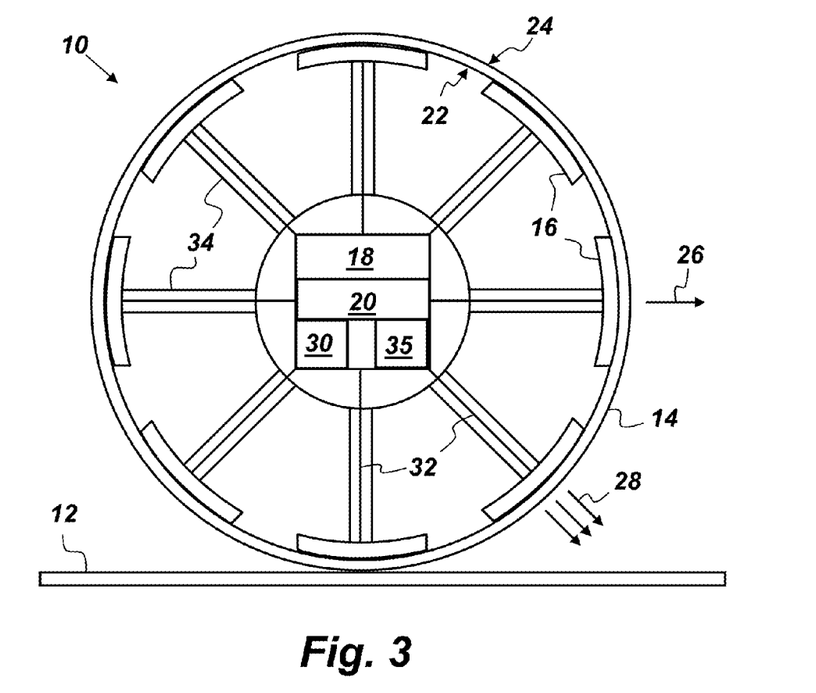
FIG. 3 is a cross-sectional view of a substantially spherical embodiment of a rolling device.

FIG. 3 is a two-dimensional cross-sectional view of the spherical embodiment of the rolling device 10 depicted in FIG. 2. As shown in FIG. 3, the controller 18, IMU 20, and sensor 30 are all mounted inside the structure 14. A power source and any and all other electronic circuits necessary to control the rolling device 10 may also be mounted within the structure 14. The controller 18 selectively sends out electrical power through power conductors 32 to energize selected electromagnets 16 to effectuate rolling movement of the rolling device 10 in the desired direction 26 over the ferrous surface 12. The ferrous surface 12 may be made of any material to which magnets are attracted. Suitable examples of the ferrous surface 12 include, but are not limited to steel hulls, metallic pipes, ship decks, etc. The rolling device 10 may also include support members 34, which provide mechanical support to the structure 14. The rolling device 10 may also optionally comprise a secondary device 35 mounted within the structure 14 and operatively coupled to the controller 18. The secondary device 35 may be any device capable of producing an output signal which is detectable from outside the structure 14. Suitable examples of the secondary device 35 include, but are not limited to a strobe light, a speaker, a gas emitter, a flash generator, an electric shock generator, a smoke screen generator, and a homing beacon.

Figure 4A:
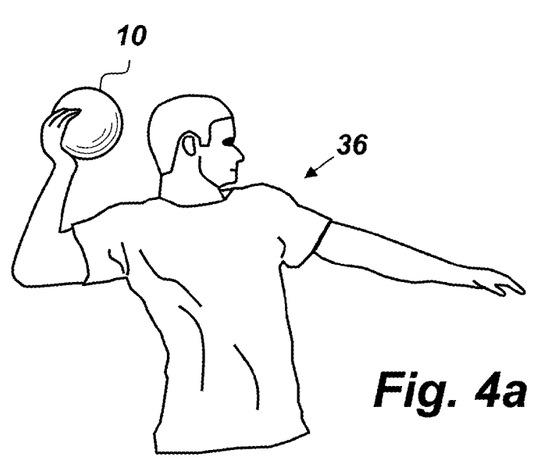
FIG. 4a is an illustration of a person throwing a rolling device.
Figure 4B:
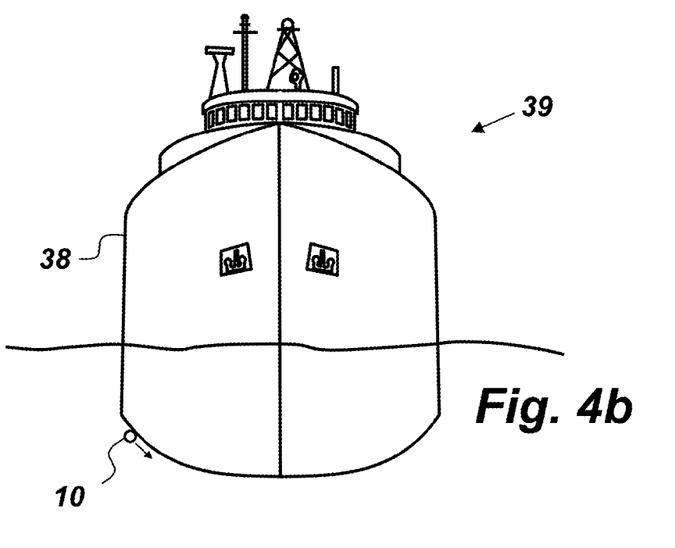
FIG. 4b is an illustration depicting a rolling device moving over the hull of a ship.

FIGS. 4a and 4b depict other embodiments of the rolling device 10. There are many different configurations and embodiments available for the rolling device 10. For example, the structure 14 may be watertight and airtight. The rolling device may be positively buoyant, neutrally buoyant, or negatively buoyant. The rolling device may be sized and ruggedized appropriately such that it may be thrown by a human 36, such as is depicted in FIG. 4a or launched by a launcher. The rolling device 10 may be sized so as to be capable of internal navigation of ferrous pipes and liquid and gas storage tanks. FIG. 4b is an illustration of the rolling device 10 moving underwater over the ferrous hull 38 of a ship 39.

Figure 5:
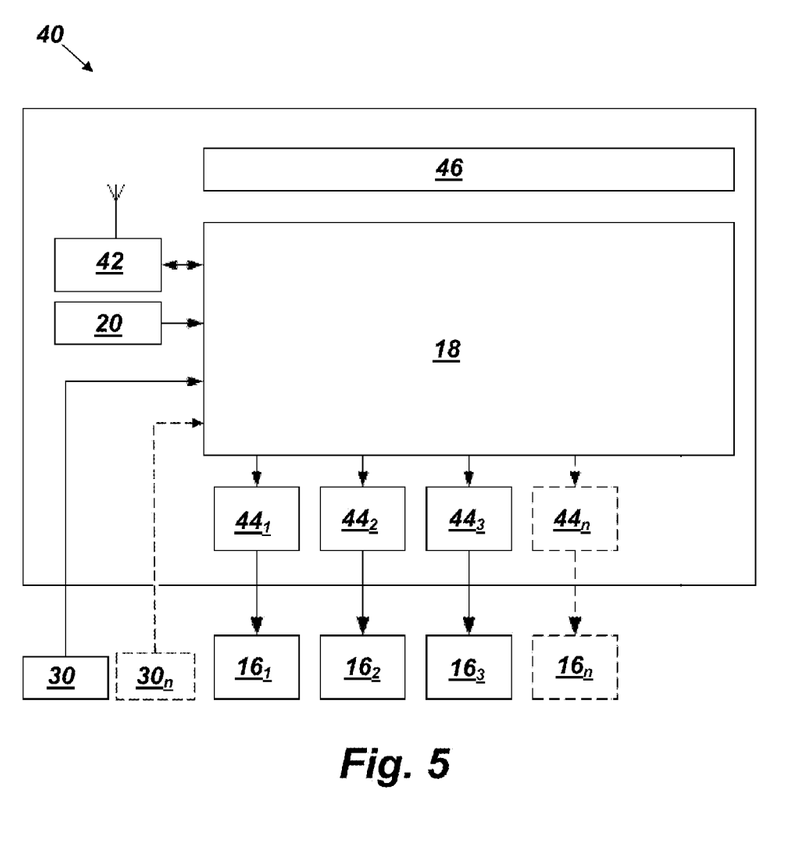
FIG. 5 is a block diagram of a control system for a rolling device.

FIG. 5 is a block diagram of an electronic control system 40 for the rolling device 10. The controller 18 may take commands like roll speed and direction from a wireless remote user via a radio frequency (RF) transceiver 42. The IMU 20 may be any device capable of providing orientation information to the controller 18. Suitable examples of the IMU 20 include, but are not limited to: an accelerometer, a gyroscope, a magnetometer, and/or any combination thereof. The controller 18 reads data from the IMU 20 to know the orientation of rolling device 10. The orientation data informs the controller 18 which of the electromagnets $16_1$-$16_n$ to energize and how strong and fast the electromagnets are switched. The controller 18 analyzes commands received via RF transceiver 42 and data from IMU 20 and sends output signals to electromagnetic driver(s) $44_1$ to $44_n$ to control the power output to electromagnet(s) $16_1$-$16_n$. The control system 40 further comprises a power supply 46. The controller 18 is shown as receiving signals from sensors $30_1$ to $30_n$. The sensor signals and navigation information may be sent to a remote control station via RF transceiver 42 for further analyzing and processing.

Figure 6A:
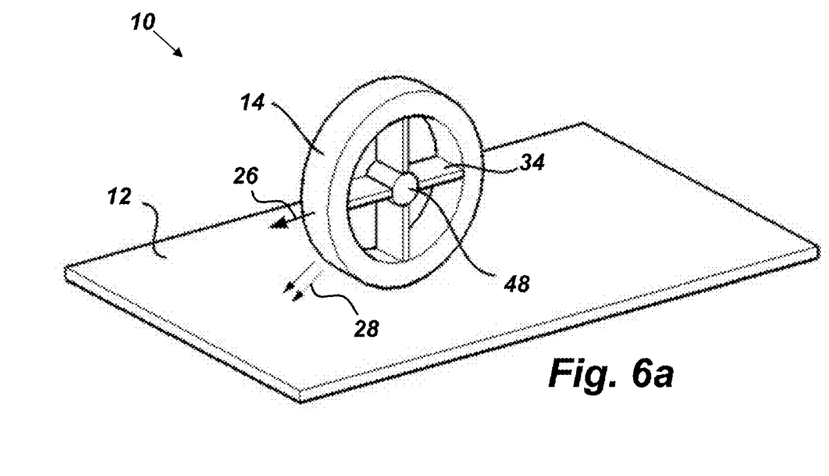
FIG. 6a is a perspective view of a wheel-shaped embodiment of a rolling device.
Figure 6B:
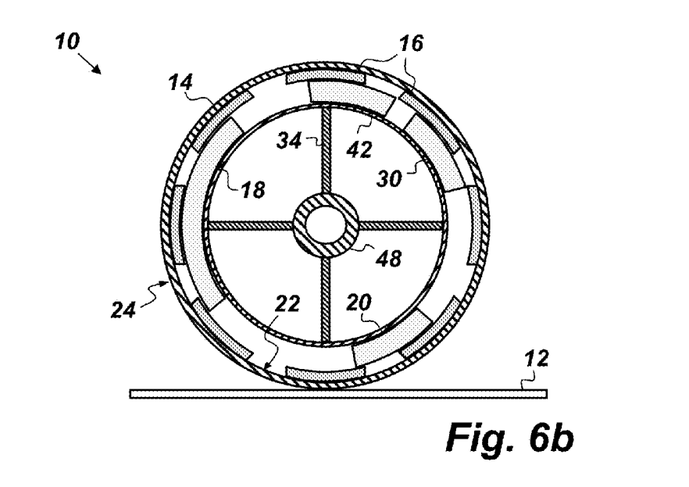
FIG. 6b is a cross sectional view of a wheel-shaped embodiment of a rolling device.

FIGS. 6a and 6b are illustrations of another embodiment of the rolling device 10 wherein the structure 14 is wheel-shaped. FIG. 6a is a perspective, three-dimensional view of the wheel-shaped structure 14 on the ferrous surface 12. In this embodiment, the wheel-shaped structure 14 further comprises a hub 48. When one of the electromagnets 16 (not shown in these views) mounted inside the structure 14 is energized properly, it attracts the ferrous surface 12 with attractive forces 28. The attractive forces 28 cause the wheel-shaped structure 14 to roll in direction 26. The energizing processes are controlled by the controller 18 located inside the structure 14. The hub 48 and supporting members 34 allow the wheel-shaped structure 14 to be attached to another body (as discussed below and shown in FIG. 7). FIG. 6b is a cross sectional, two-dimensional view of the embodiment of the wheel-shaped rolling device 10 shown in FIG. 6a.

Figure 7:
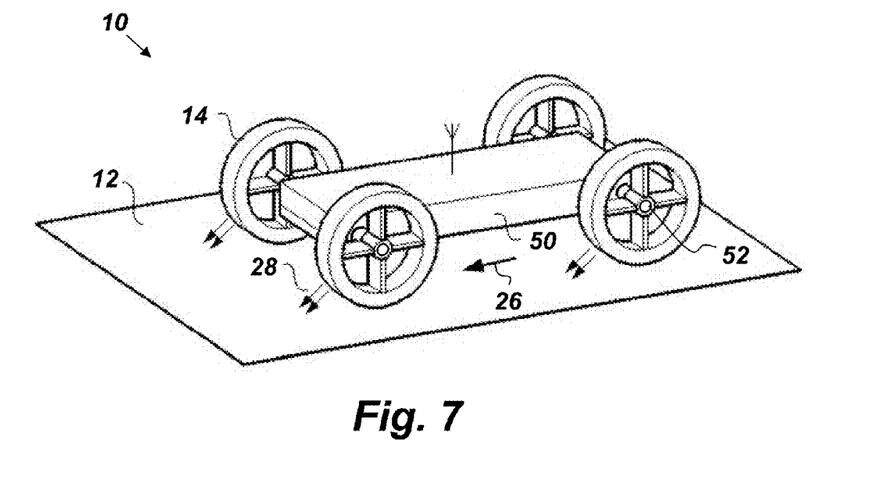
FIG. 7 is a perspective view of a four-wheeled embodiment of a rolling device.
Figure 8A:
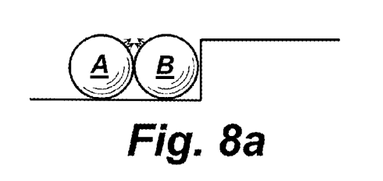
FIGS. 8a-8f are sequential illustrations of two interactive rolling devices overcoming an obstacle.
Figure 8B:
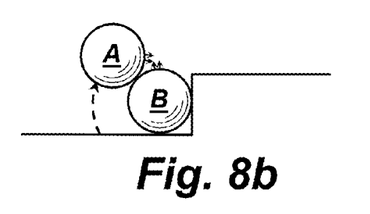
Figure 8C:
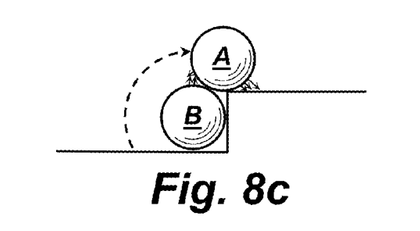
Figure 8D:
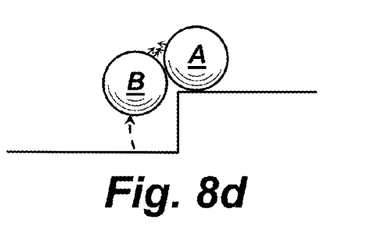
Figure 8E:
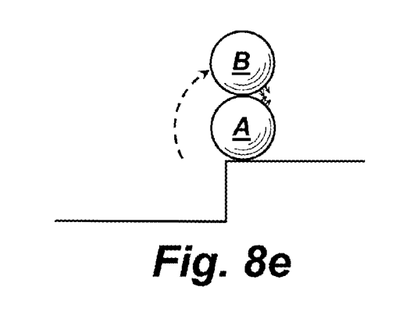
Figure 8F:
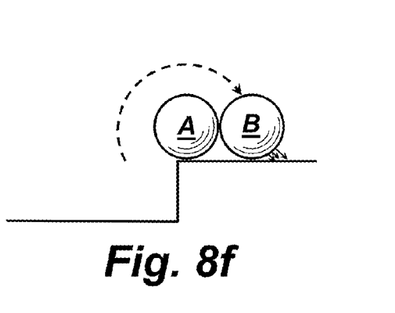

FIG. 7 is a three-dimensional perspective view of another embodiment of the rolling device 10. In this embodiment, the rolling device 10 comprises multiple wheel-shaped structures 14, such as the wheel-shaped structure depicted in FIGS. 6a-6b. Each wheel-shaped structure 14 is coupled to a frame 50 via axles 52. In this multi-wheel embodiment, the controller 18 may be mounted to the frame 50 and control the rotation of each of the wheel-shaped structures 14. The sensor 30 and optional secondary device 35 may also be mounted to the frame 50. The controller 18 may wirelessly control each of the wheel-shaped structures 14. Each wheel-shaped structure 14 may comprise its own IMU 20 in communication with the controller 18.

FIGS. 8a-8f are sequential illustrations showing how two rolling devices 10, depicted as device A and device B, may interact with each other to traverse obstacles. As shown, if device B encounters an obstacle it can energize some of its electromagnets 16 to attract device A in such a way that device A climbs over device B in a "leap-frog" type maneuver thus allowing both device A and device B to traverse the obstacle. Multiple co-operating rolling devices 10 can climb on each other to reach a desired height, and/or attach to each other to form any desired shape such as a string, a bridge, and a ladder.

From the above description of the electromagnet-based rolling device 10, it is manifest that various techniques may be used for implementing the concepts of the rolling device 10 without departing from its scope. The described embodiments are to be considered in all respects as illustrative and not restrictive. It should also be understood that the rolling device 10 is not limited to the particular embodiments described herein, but is capable of many embodiments without departing from the scope of the claims.

I claim:

1. A rolling device comprising:
   a substantially spherical structure having spherical inner and outer surfaces and a closed-shape cross section;
   a plurality of electromagnets mounted to the inner surface and distributed over a periphery of the structure;
   a controller, mounted within the structure, operatively coupled to each of the electromagnets; and
   an inertial measurement unit (IMU) mounted within the structure and configured to provide inertial measurements to the controller
   wherein the structure contains no moving parts and the controller is configured to cause the structure to adhere to and roll over a ferrous surface in a desired direction by selectively energizing individual electromagnets while de-energizing other electromagnets.

2. The rolling device of claim 1, further comprising a sensor mounted within the structure and operatively coupled to the controller, wherein the sensor is configured to generate an output signal representative of an environmental characteristic outside the structure.

3. The rolling device of claim 2, wherein the sensor is a video camera.

4. The rolling device of claim 1, further comprising a radio frequency (RF) transceiver and an antenna, both operatively coupled to the controller and mounted within the structure.

5. The rolling device of claim 4, wherein the ferrous surface is the hull of a vessel.

6. The rolling device of claim 1, further comprising a strobe light mounted within the structure and operatively coupled to the controller.

7. A substantially spherical rolling device comprising:
a transparent substantially spherical shell;
a plurality of electromagnets distributed over, and mounted to, the inside surface of the spherical shell;
a controller mounted to the inside of the spherical shell and operatively coupled to each of the electromagnets;
an inertial measurement unit mounted to the inside of the spherical shell and operatively coupled to the controller;
at least one sensor configured to sense a characteristic of an atmosphere outside of the spherical shell; and
wherein the structure contains no moving parts and the controller is configured to selectively energize and de-energize individual electromagnets in order to cause the spherical shell to adhere to and roll over a ferrous surface in a desired direction such that propulsion and adhesion are performed solely via the electromagnets.

8. The rolling device of claim 7, further comprising a global positioning system (GPS) sensor mounted within the spherical shell and operatively coupled to the controller and wherein the at least one sensor is a depth sensor and the ferrous surface is a hull of a vessel.

9. The rolling device of claim 7, wherein the at least one sensor is selected from the group consisting of: a microphone, a pressure sensor, a chemical sensor, a temperature sensor, a still camera, a video camera, and a radioactivity sensor.

* * * * *